United States Patent
Marois

(10) Patent No.: US 12,162,597 B1
(45) Date of Patent: Dec. 10, 2024

(54) DIRECTIONAL TAIL THRUST SYSTEMS FOR ROTORCRAFT

(71) Applicant: Bell Textron Canada Limited, Mirabel (CA)

(72) Inventor: Francis Marois, Saint-Jerome (CA)

(73) Assignee: Bell Textron Canada Limited (CA)

( * ) Notice: Subject to any disclaimer, the term of this patent is extended or adjusted under 35 U.S.C. 154(b) by 0 days.

(21) Appl. No.: 18/220,232

(22) Filed: Jul. 10, 2023

(51) Int. Cl.
*B64C 27/82* (2006.01)

(52) U.S. Cl.
CPC ...... *B64C 27/82* (2013.01); *B64C 2027/8245* (2013.01)

(58) Field of Classification Search
CPC ............ B64C 27/82; B64C 2027/8245; B64C 2027/8272
See application file for complete search history.

(56) References Cited

U.S. PATENT DOCUMENTS

| | | | | |
|---|---|---|---|---|
| 3,510,087 A | * | 5/1970 | Strickland | B64C 27/82 244/17.19 |
| 3,807,662 A | * | 4/1974 | Velazquez | B64C 27/82 244/17.19 |
| 5,934,608 A | * | 8/1999 | Dockter | B64C 27/82 244/17.19 |
| 7,731,121 B2 | * | 6/2010 | Smith | B64C 27/82 244/17.19 |
| 8,469,308 B2 | | 6/2013 | Robertson et al. | |
| 8,636,244 B2 | | 1/2014 | Groninga | |
| 8,636,246 B2 | | 1/2014 | Robertson et al. | |
| 2008/0093500 A1 | * | 4/2008 | Smith | B64C 27/82 244/17.19 |
| 2022/0169374 A1 | | 6/2022 | Landry | |

* cited by examiner

*Primary Examiner* — Philip J Bonzell

(74) *Attorney, Agent, or Firm* — Lawrence Youst PLLC

(57) ABSTRACT

A directional tail thrust system for a helicopter includes a tailboom defining an internal air passage. The aft portion of the internal air passage includes an aft diffuser. The directional tail thrust system also includes a fan in fluid communication with the aft diffuser and a vane array including vanes coupled to the aft diffuser and configured to receive air from the fan via the aft diffuser. The vanes are pivotable to switch the vane array between various modes including an anti-torque mode to produce anti-torque thrust, a forward thrust mode to produce forward thrust and a pro-torque mode to produce pro-torque thrust.

19 Claims, 10 Drawing Sheets

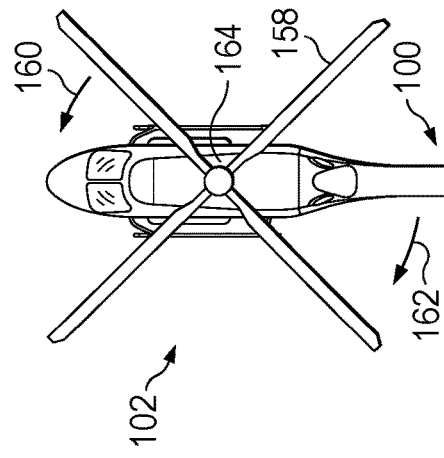
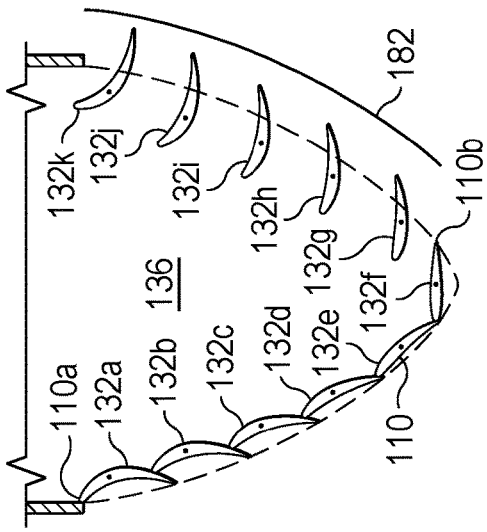
FIG. 5G  FIG. 5H
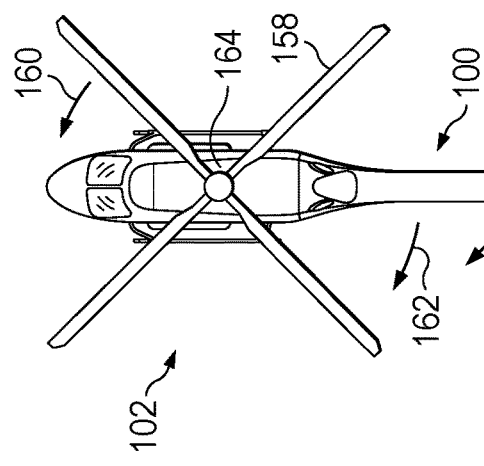
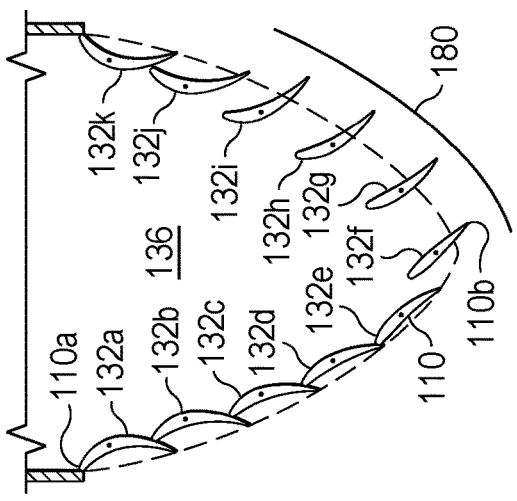
FIG. 5I  FIG. 5J
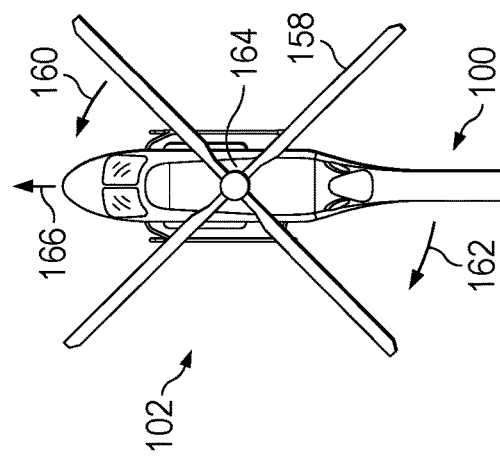
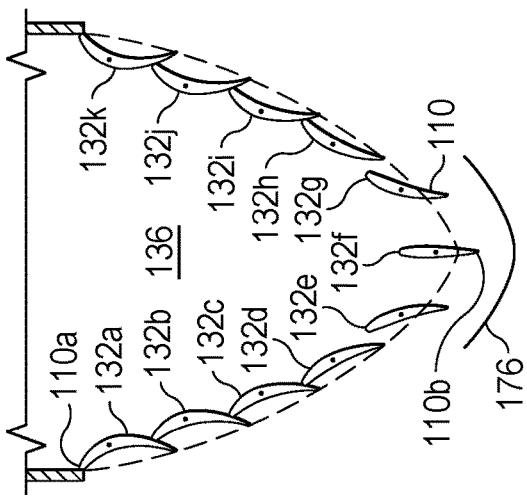
FIG. 5K  FIG. 5L

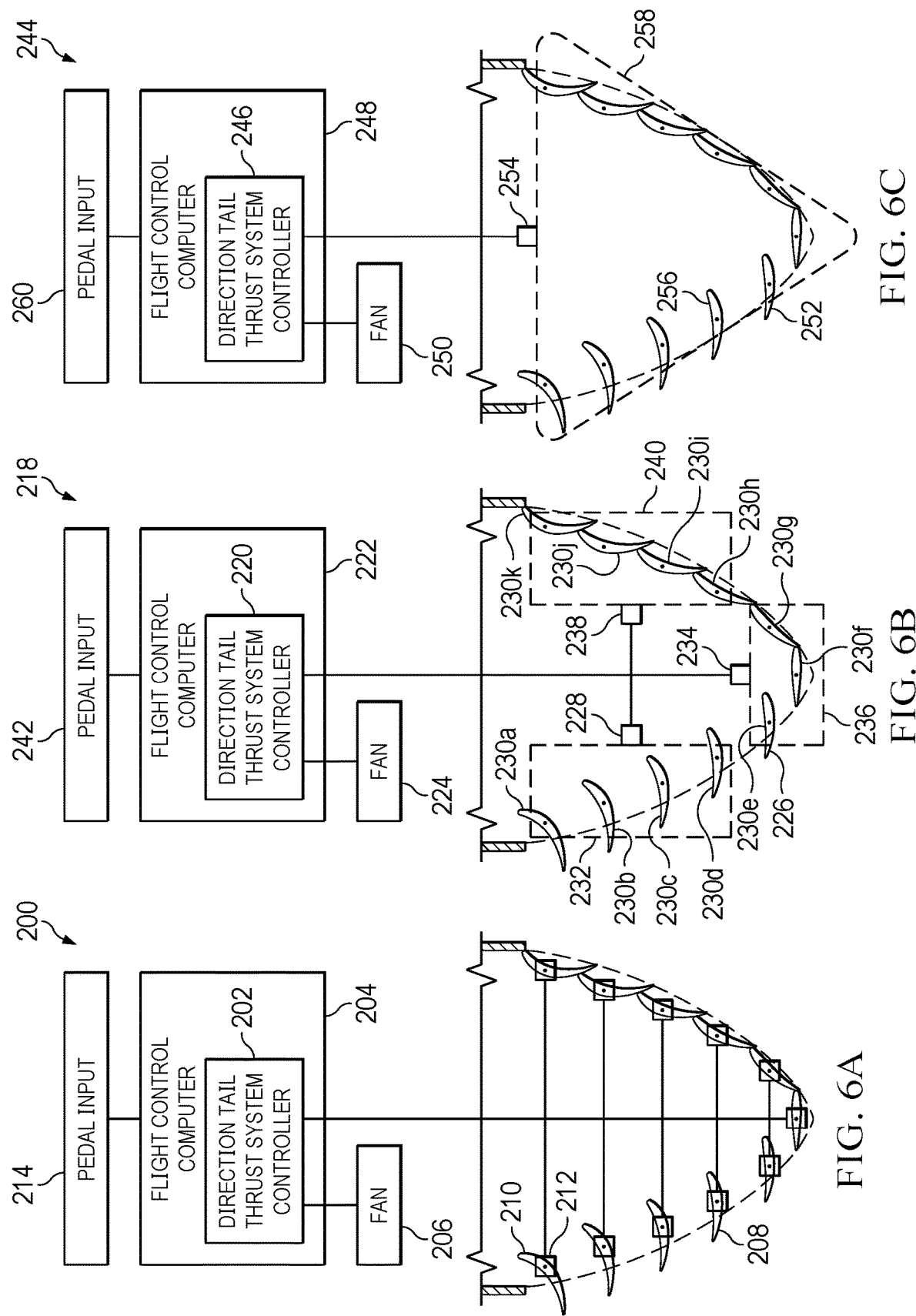

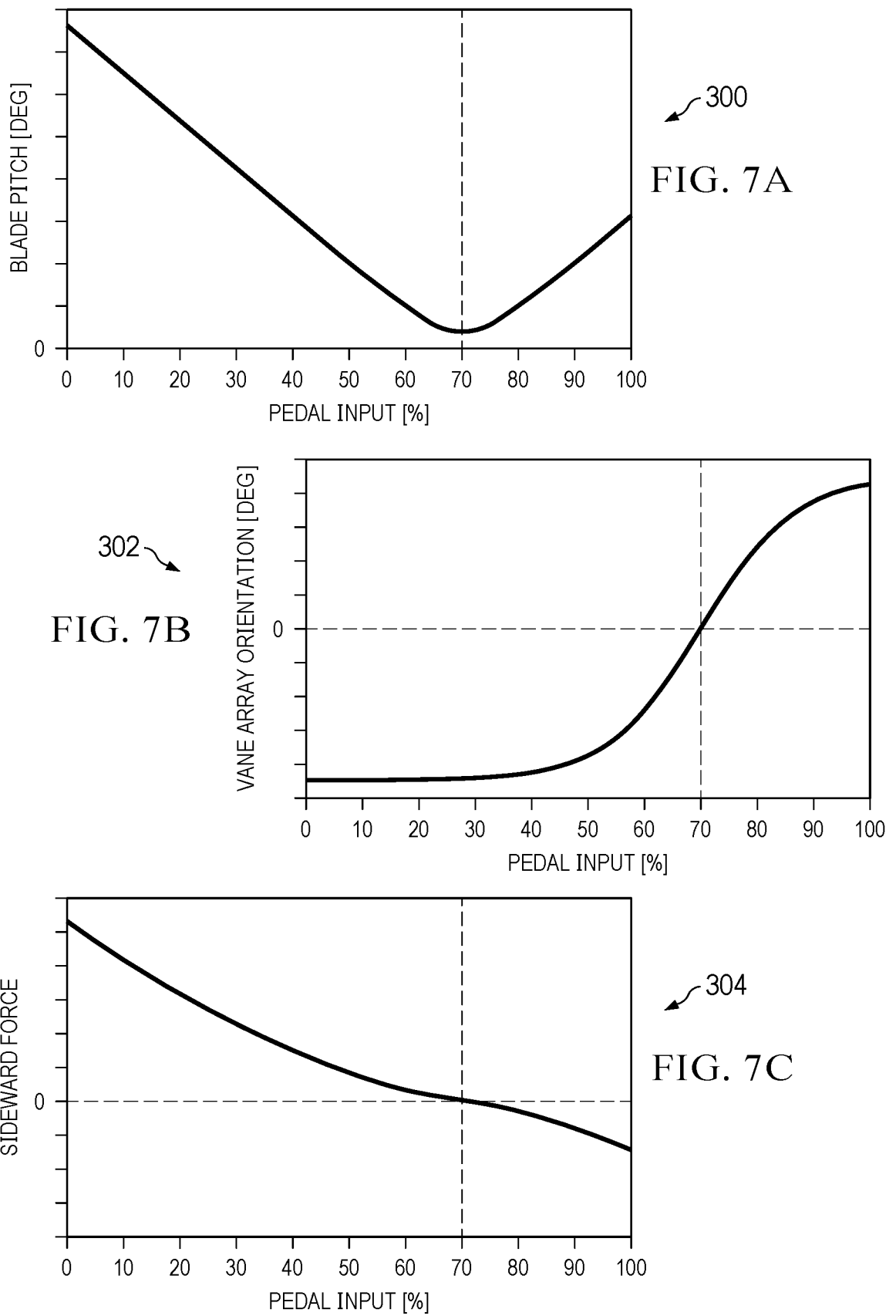

DIRECTIONAL TAIL THRUST SYSTEMS FOR ROTORCRAFT

TECHNICAL FIELD OF THE DISCLOSURE

The present disclosure relates, in general, to anti-torque systems for use on rotorcraft and, in particular, to directional tail thrust systems including a tailboom that defines an internal air passage and a vane array disposed at the aft end of the tailboom that is pivotable between various modes including an anti-torque mode, a forward thrust mode and a pro-torque mode.

BACKGROUND

The main rotor of a helicopter, which produces lift necessary for flight, also produces a torque force on the fuselage of the helicopter. The tail rotor of the helicopter, located at the aft end of the tailboom, is used to counteract this torque and control the yaw of the helicopter during flight. Tail rotors are normally mounted on a horizontal axis perpendicular to the forward direction of flight of the helicopter. The tail rotor blades of conventional tail rotors change pitch to control the intensity of anti-torque thrust. Most conventional tail rotors are rotationally driven by an engine mechanically linked to the tail rotor by a gearbox and a driveshaft extending through the tailboom.

Traditional tail rotors suffer from several drawbacks. For example, current tail rotors may be prone to blade stall within their operational envelopes. Also, the main rotor of a helicopter produces a transverse airflow while the tail rotor may be driven at high angular velocities to provide adequate aerodynamic responses to such airflow. Sometimes, vortices produced by the main rotor of the helicopter and the tail rotor can interact to reduce the efficiency of the thrust created by the rotors. Traditional tail rotors can also be a significant source of noise in current helicopters, thus diminishing effectiveness when a reduced noise environment is preferable such as during air reconnaissance or clandestine operations or in urban environments. For example, the interference of the vortices produced by the main rotor of the helicopter and the tail rotor may cause an increase in noise. In addition, although the anti-torque requirement of a helicopter is significantly less in forward flight than in hover, many current tail rotors continue to rotate at high speed in forward flight, thus producing unnecessary noise both directly by the spinning blades and indirectly via transmission noise. Forward flight efficiency is also diminished as a result of the drag created by the tail rotor. Some tail rotors may also pose a threat to the structural integrity of the helicopter. For example, sharp changes in the anti-torque load of a tail rotor in some flight conditions may strain the airframe of the helicopter or the tail rotor itself. In open rotor designs, the exposed tail rotor blades pose the safety hazard of potentially striking people or other objects while in operation. Traditional tail rotors are also incapable of providing forward thrust for the helicopter, and therefore cannot contribute to forward propulsion. Accordingly, a need has arisen for tail thrust systems that address these and other drawbacks of traditional tail rotors.

SUMMARY

In a first aspect, the present disclosure is directed to a directional tail thrust system for a helicopter. The directional tail thrust system includes a tailboom defining an internal air passage. The aft portion of the internal air passage includes an aft diffuser. The directional tail thrust system also includes a fan in fluid communication with the aft diffuser and a vane array including vanes coupled to the aft diffuser and configured to receive air from the fan via the aft diffuser. The vanes are pivotable to switch the vane array between various modes including an anti-torque mode to produce anti-torque thrust, a forward thrust mode to produce forward thrust and a pro-torque mode to produce pro-torque thrust.

In some embodiments, the internal air passage may include a forward diffuser and a straight ducting section interposed between the forward diffuser and the aft diffuser. In certain embodiments, each vane may rotate about a respective rotational axis, the rotational axes of the vanes perpendicular to the longitudinal axis of the helicopter. In some embodiments, the vanes may be arranged along a curved profile to form a vane plenum. In certain embodiments, the vanes may include anti-torque vanes and pro-torque vanes, the anti-torque and pro-torque vanes each pivotable between an open position, a closed position and intermediate positions therebetween. In such embodiments, the anti-torque vanes may be in the open position and the pro-torque vanes may be in the closed position in the anti-torque mode and the anti-torque vanes may be in the closed position and the pro-torque vanes may be in the open position in the pro-torque mode. In some embodiments, the anti-torque vanes may rotate into the closed position successively from the forward end to the aft end of the vane array when switching out of the anti-torque mode and rotate into the open position successively from the aft end to the forward end of the vane array when switching into the anti-torque mode. In certain embodiments, the pro-torque vanes may rotate into the closed position successively from the forward end to the aft end of the vane array when switching out of the pro-torque mode and rotate into the open position successively from the aft end to the forward end of the vane array when switching into the pro-torque mode.

In some embodiments, the vanes may include one or more center vanes interposed between the anti-torque vanes and the pro-torque vanes. In such embodiments, a forward subset of the anti-torque vanes may be in the closed position, an aft subset of the anti-torque vanes may be in the open position, a forward subset of the pro-torque vanes may be in the closed position, an aft subset of the pro-torque vanes may be in the open position and the one or more center vanes may be parallel with a longitudinal axis of the helicopter in the forward thrust mode. In certain embodiments, the vanes may pivot at nonuniform rotational speeds when switching between the modes. In some embodiments, the vanes may include fixed geometry vanes. In certain embodiments, the vanes may have nonuniform chordwise lengths. In some embodiments, the vanes may have nonuniform airfoil shapes. In certain embodiments, two or more of the vanes may have a fixed geometry cambered airfoil shape. In such embodiments, the two or more vanes having the fixed geometry cambered airfoil shape may have nonuniform cambers. In some embodiments, one or more of the vanes may have a double cambered airfoil shape including a positive cambered section and a negative cambered section.

In a second aspect, the present disclosure is directed to a rotorcraft including a fuselage and a directional tail thrust system. The directional tail thrust system includes a tailboom extending from the fuselage, the tailboom defining an internal air passage having an aft portion including an aft diffuser. The directional tail thrust system also includes a fan in fluid communication with the aft diffuser and a vane array including vanes coupled to the aft diffuser and configured to receive air from the fan via the aft diffuser. The vanes are pivotable to switch the vane array between various modes including an anti-torque mode to produce anti-torque thrust, a forward thrust mode to produce forward thrust and a pro-torque mode to produce pro-torque thrust.

In some embodiments, the fuselage may define an air inlet forward of the fan. In certain embodiments, the vanes may partially enclose a vane plenum in fluid communication with the aft diffuser. In such embodiments, at least a portion of the vanes may be pivotable between an open position to allow air out of the vane plenum, a closed position to at least partially block air from exiting the vane plenum and intermediate positions therebetween. In some embodiments, the vanes may include anti-torque vanes, pro-torque vanes and one or more center vanes interposed between the anti-torque vanes and the pro-torque vanes. In such embodiments, the one or more center vanes may have a symmetrical airfoil shape and the anti-torque vanes and the pro-torque vanes may have a cambered airfoil shape. In certain embodiments, the cambers of the anti-torque vanes and the pro-torque vanes may vary from increasing to decreasing camber from the forward end of the vane array to the aft end of the vane array. In some embodiments, the vanes may have a vertical orientation relative to the ground.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 5A-5L are various views of a directional tail thrust system switching between different modes in accordance with embodiments of the present disclosure;

FIGS. 6A-6C are schematic illustrations of various directional tail thrust systems using different actuator-to-vane ratios in accordance with embodiments of the present disclosure;

FIGS. 7A-7C are graphs plotting various operational parameters of a directional tail thrust system against pedal input percentage in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
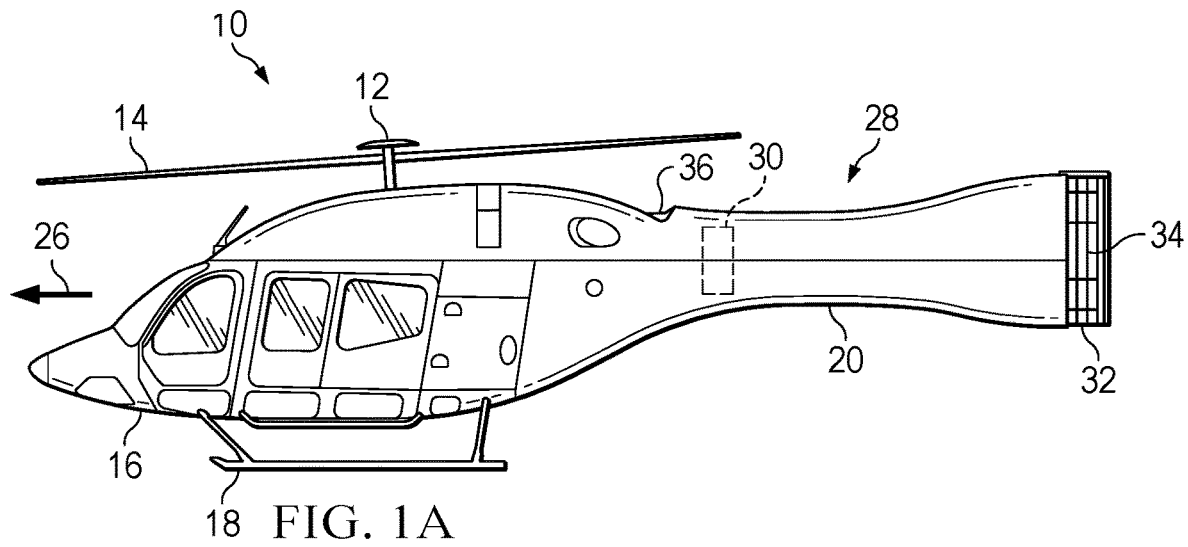
FIGS. 1A-1C are schematic illustrations of a rotorcraft having a directional tail thrust system in accordance with embodiments of the present disclosure.
Figure 1B:
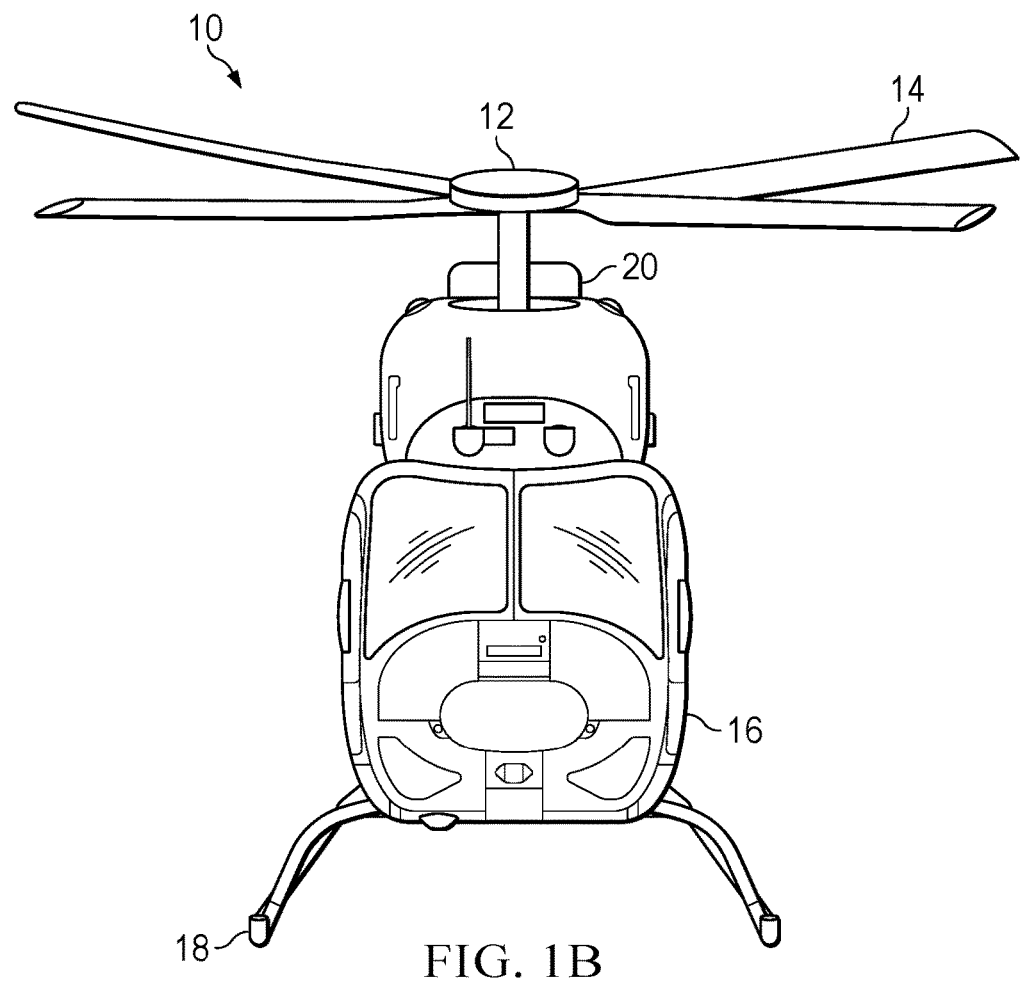
Figure 1C:
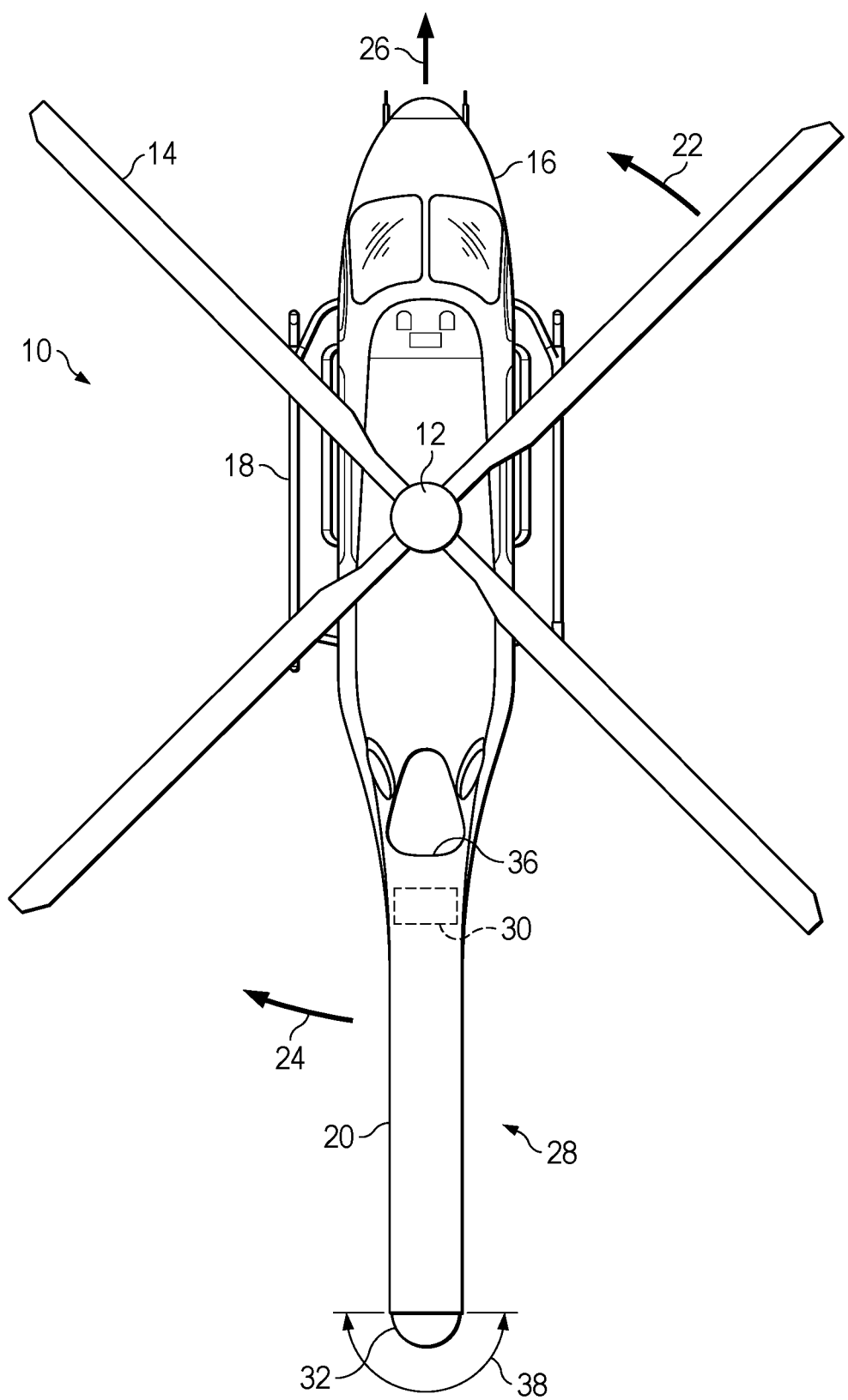

Referring to FIGS. 1A-1C in the drawings, a rotorcraft is schematically illustrated and generally designated 10. In the illustrated embodiment, rotorcraft 10 is depicted as a helicopter having a main rotor 12, which includes a plurality of rotor blades 14. Main rotor 12 is rotatable relative to a fuselage 16. The pitch of rotor blades 14 can be collectively and/or cyclically manipulated to selectively control direction, thrust and lift of rotorcraft 10. A landing gear system 18 including skids provides ground support for rotorcraft 10. A tailboom 20 extends from fuselage 16 in the aft direction. Main rotor 12 rotates in a direction indicated by arrow 22, which produces a torque on fuselage 16 in a direction indicated by arrow 24. It will be appreciated that direction of rotation 22 of main rotor 12 and torque 24 on fuselage 16 may be reversed depending on the rotorcraft.

Helicopters have traditionally used a tail rotor mounted to the aft end of a tailboom to counteract torque 24 on fuselage 16. Tail rotors are normally mounted on a horizontal axis perpendicular to forward direction of flight 26 of the helicopter. The tail rotor blades of conventional tail rotors change pitch to control the intensity of anti-torque thrust. Most conventional tail rotors are rotationally driven by an engine mechanically linked to the tail rotor by a gearbox and a driveshaft extending through the tailboom. Traditional tail rotors, however, suffer from several drawbacks. For example, tail rotors may be prone to blade stall within their operational envelopes. Also, the main rotor of a helicopter produces a transverse airflow while the tail rotor may be driven at high angular velocities to provide adequate aerodynamic responses to such airflow. Sometimes, vortices produced by the main rotor of the helicopter and the tail rotor can interact to reduce the efficiency of the thrust created by the rotors. Traditional tail rotors can also be a significant source of noise in current helicopters, thus diminishing effectiveness when a reduced noise environment is preferable such as during air reconnaissance or clandestine operations or in urban environments. For example, the interference of the vortices produced by the main rotor of the helicopter and the tail rotor may cause an increase in noise. In addition, although the anti-torque requirement of a helicopter is significantly less in forward flight than in hover, many current tail rotors continue to rotate at high speed in forward flight, thus producing unnecessary noise both directly by the spinning blades and indirectly via transmission noise. Forward flight efficiency is also diminished as a result of the drag created by the tail rotor. Some tail rotors may also pose a threat to the structural integrity of the helicopter. For example, sharp changes in the anti-torque load of a tail rotor in some flight conditions may strain the airframe of the helicopter or the tail rotor itself. In open rotor designs, the exposed tail rotor blades pose the safety hazard of potentially striking people or other objects while in operation. Traditional tail rotors are also incapable of providing forward thrust for the helicopter, and therefore cannot contribute to forward propulsion.

To address these and other drawbacks of traditional tail rotors, rotorcraft 10 includes a directional tail thrust system 28. Directional tail thrust system 28 includes an internal fan 30 near the base, or forward end, of tailboom 20 and a vane array 32 coupled to the aft end of tailboom 20. Vane array 32 includes vanes 34, which are generally vertically-oriented with respect to the ground, as best seen in FIG. 1A. Fan 30 pulls air from air inlet 36 atop fuselage 16 to supply a variable mass flow of air through tailboom 20 to vane array 32. Vane 34 are pivotable to direct the air from fan 30 in any desired direction in a 180 degree sweep angle 38 from the port to the starboard side of rotorcraft 10. In particular, vane array 32 may direct air from fan 30 to produce anti-torque thrust to counteract torque 24 on fuselage 16, pro-torque thrust to supplement torque 24 on fuselage 16, forward thrust to supplement the forward thrust produced by main rotor 12 in forward flight 26 or directional thrusts that are intermediate to the anti-torque, pro-torque and forward thrusts. In the illustrated embodiment, angle 38 through which the air jet produced by directional tail thrust system 28 may be swept is 180 degrees, although in other embodiments angle 38 may be less than or greater than 180 degrees to provide a narrower or wider sweep angle 38. The vertical orientation of vane array 32 including vanes 34 encompasses tilted and/or canted orientations of vane array 32. For example, vane array 32 may have a downward tilt wherein the top end of vane array 32 is aft of the bottom end of vane array 32, thereby generating lift when vane array 32 produces forward thrust. In another example, vane array 32 may be canted toward the port side of helicopter 10 wherein the top end of vane array 32 is positioned toward the port side of helicopter 10 and the bottom end of vane array 32 is positioned toward the starboard side of helicopter 10, thereby orienting the air jet downward and generating lift when producing anti-torque thrust. In another embodiment, vane array 32 may be both tilted and canted along the longitudinal and lateral axes of helicopter 10.

It should be appreciated that rotorcraft 10 depicted as a helicopter is merely illustrative of a variety of aircraft that can implement the embodiments disclosed herein. Indeed, directional tail thrust system 28 may be implemented on any aircraft. Other aircraft implementations can include hybrid aircraft, tiltwing aircraft, tiltrotor aircraft, quad tiltrotor aircraft, unmanned aircraft, gyrocopters, compound helicopters, drones and the like. As such, those skilled in the art will recognize that directional tail thrust system 28 can be integrated into a variety of aircraft configurations. It should be appreciated that even though aircraft are particularly well-suited to implement the embodiments of the present disclosure, non-aircraft vehicles and devices can also implement the embodiments.

Figure 2A:
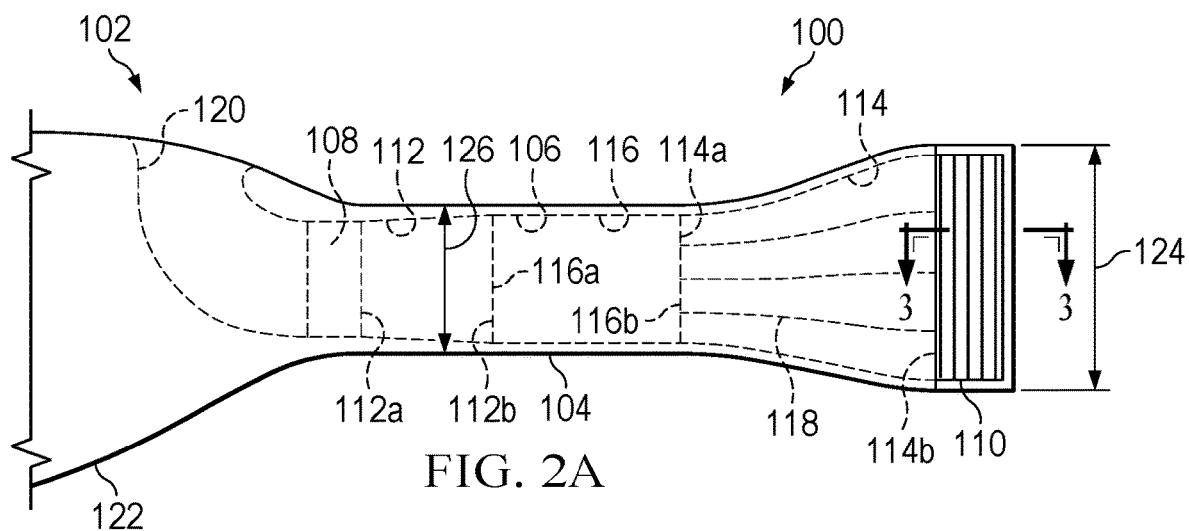
FIGS. 2A-2B are various views of a directional tail thrust system for a rotorcraft in accordance with embodiments of the present disclosure.
Figure 2B:
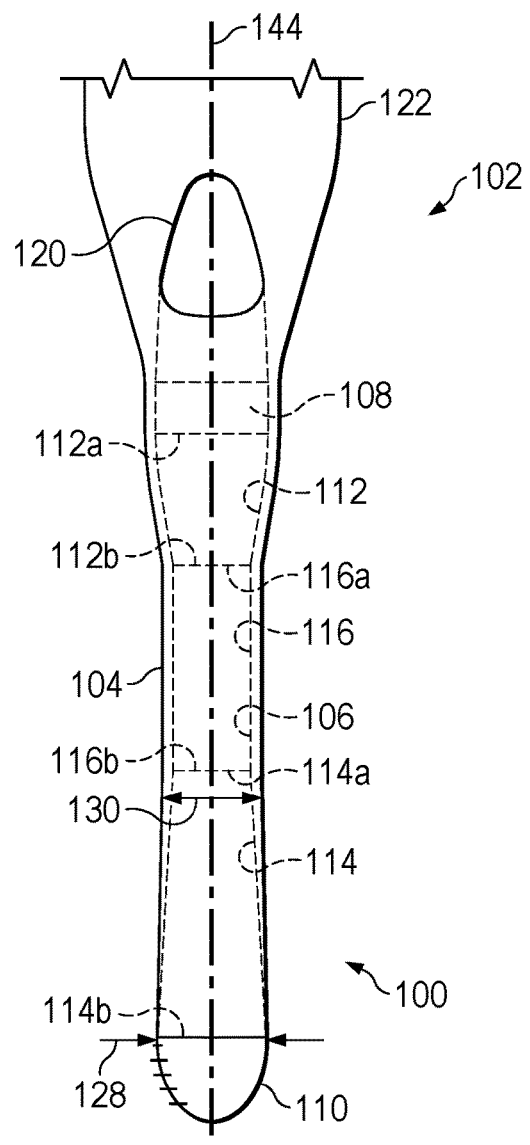

Referring to FIGS. 2A-2B in the drawings, a directional tail thrust system is schematically illustrated and generally designated 100. Directional tail thrust system 100 is implemented on helicopter 102 and includes tailboom 104, which defines an internal air passage 106. Fan 108, which is in fluid communication with internal air passage 106, pushes air through internal air passage 106 to vane array 110. Internal air passage 106 is segmented and includes a forward diffuser 112 defined by a forward portion of tailboom 104, an aft diffuser 114 defined by an aft portion of tailboom 104 and a straight ducting section 116 defined by a middle portion of tailboom 104 and interposed between forward diffuser 112 and aft diffuser 114. The cross-sectional area of aft end 112b of forward diffuser 112 is greater than the cross-sectional area of forward end 112a of forward diffuser 112, which lowers the speed of air passing through forward diffuser 112. In some embodiments, forward end 112a of forward diffuser 112 has a generally circular or rounded cross-sectional area and aft end 112b of forward diffuser 112 has a generally rectangular cross-sectional area. In other embodiments, the cross-sectional area of aft end 112b of forward diffuser 112 may be less than the cross-sectional area of forward end 112a of forward diffuser 112. The cross-sectional area of aft end 116b of straight ducting section 116 is about the same as the cross-sectional area of forward end 116a of straight ducting section 116. The cross-sectional area of aft end 114b of aft diffuser 114 is greater than the cross-sectional area of forward end 114a of aft diffuser 114, which lowers the speed of air passing through aft diffuser 114. In some embodiments, aft diffuser 114 may include internal guide walls 118 that segment aft diffuser 114 into smaller air diffusion zones. The difference in cross-sectional area between forward and aft ends 114a, 114b of aft diffuser 114 is greater than the difference in cross-sectional area between forward and aft ends 112a, 112b of forward diffuser 112. Thus, aft diffuser 114 is larger than forward diffuser 112 and air moving through internal air passage 106 is diffused primarily at aft diffuser 114. Diffusing air proximate the aft end of tailboom 104 allows for a narrower tailboom since the cross-sectional area of internal air passage 106 may remain relatively small until air is diffused at aft diffuser 114 near vane array 110. A narrower tailboom reduces the weight and sideward drag penalty contributed by tailboom 104 in flight. Aft diffuser 114 allows for a larger outlet area of vane array 110, which increases the mass flow through internal air passage 106 for a given thrust. In other embodiments, aft diffuser 114 may be the sole diffuser of internal air passage 106, with the remainder of internal air passage 106 forward of aft diffuser 114 having a straight ducting configuration. In yet other embodiments, internal air passage 106 may not have a straight ducting section such as straight ducting section 116 such that air is diffused continuously, at uniform or nonuniform levels, as it passes through internal air passage 106. In the illustrated embodiment, internal air passage 106 is ventless and therefore air passing through internal air passage 106 is not emitted from tailboom 104 until it reaches vane array 110.

Fan 108, located forward of internal air passage 106, may be an axial fan, crossflow fan or any other type of fan. In other embodiments, fan 108 may be located along internal air passage 106 such as within forward diffuser 112, straight ducting section 116 or aft diffuser 114. While the illustrated embodiment shows a single fan 108 moving air through internal air passage 106, in other embodiments directional tail thrust system 100 may include two or more fans placed upstream and downstream from one another. Fan 108 pulls air from outside helicopter 102 via air inlet 120 defined by fuselage 122 of helicopter 102. In the illustrated embodiment, air inlet 120 is located on the top side of fuselage 122 to avoid ingesting debris on or near the ground and also to protect ground personnel. Air inlet 120 may alternatively or additionally be located on the sides or bottom of fuselage 122. In yet other embodiments, fan 108 may pull engine cooling air and/or engine exhaust into internal air passage 106 in addition to air from air inlet 120, thereby reducing the IR signature of helicopter 102 to avoid detection. Once air reaches the aft end of tailboom 104, it is diverted by vane array 110 to produce thrust in a desired direction. Due at least in part to the narrowness of tailboom 104 enabled by the inclusion of aft diffuser 114, height 124 of vane array 110 is greater than height 126 of tailboom 104 at forward diffuser 112, straight ducting section 116 and forward end 114a of aft diffuser 114. In contrast, width 128 of the forward end of vane array 110 is generally uniform with width 130 of tailboom 104 at straight ducting section 116 and aft diffuser 114, although both height 124 and width 128 of vane array 110 may vary depending on the employed embodiment.

Figure 3:
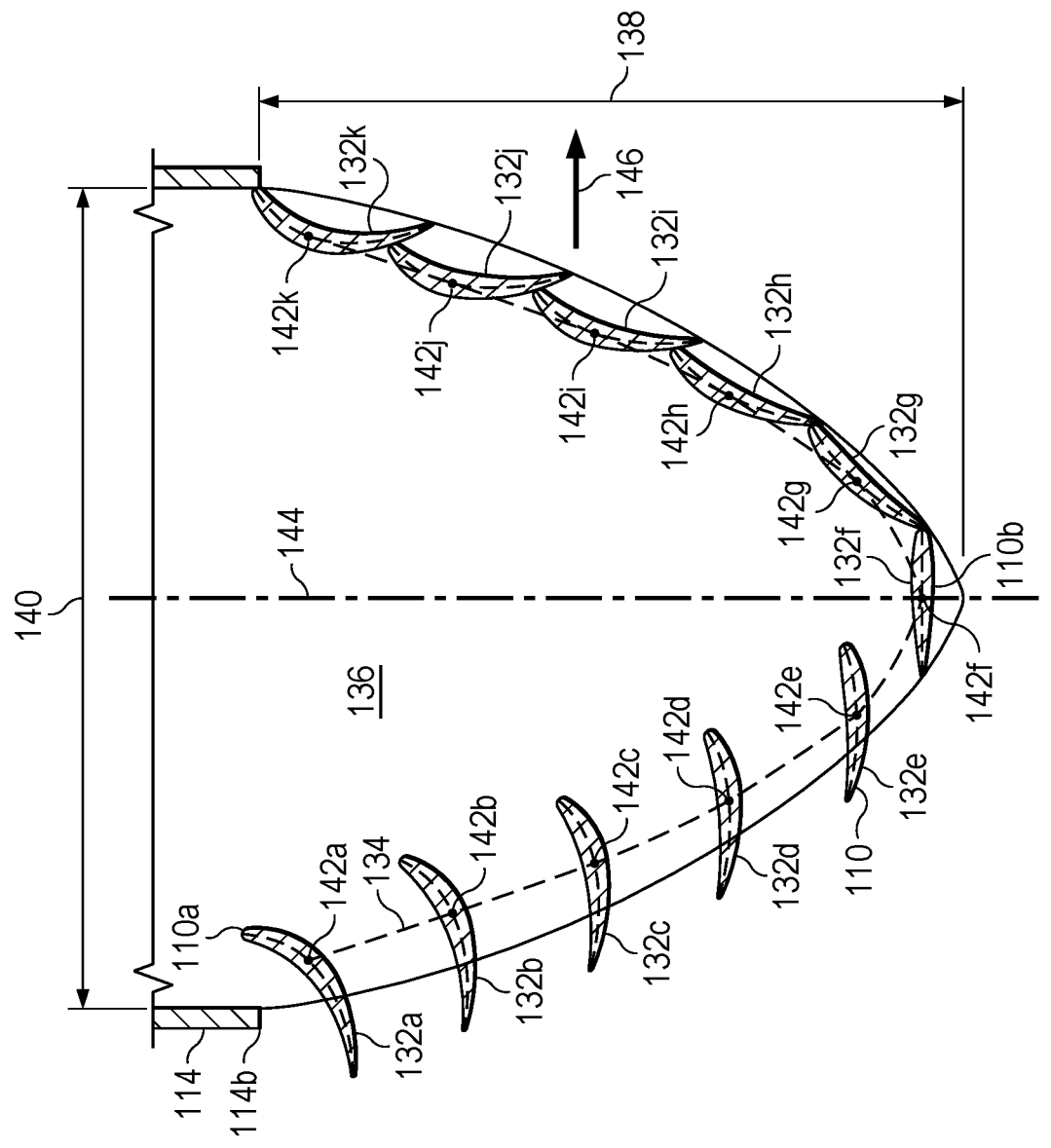
FIG. 3 is a cross-sectional view of a vane array for a directional tail thrust system in accordance with embodiments of the present disclosure.

Referring additionally to FIG. 3 in the drawings, a cross-sectional view of vane array 110 taken along line 3-3 in FIG. 2A is schematically illustrated. Forward end 110a of vane array 110 is coupled to aft end 114b of aft diffuser 114. Vane array 110 includes vanes 132a, 132b, 132c, 132d, 132e, 132f, 132g, 132h, 132i, 132j, 132k, collectively referred to as vanes 132. While vane array 110 includes eleven vanes, in other embodiments vane array 110 may include less or more than eleven vanes. Vanes 132 are arranged along a curved profile 134 to form a vane plenum 136. In the illustrated embodiment, curved profile 134 has a generally prolate ellipsoid shape, although curved profile 134 of vane array 110 may have any shape to partially define vane plenum 136 such as an oblate ellipsoid, elliptical, semi-circular, parabolic, polygonal or other shape. Also, although vane array 110 is illustrated as being symmetric about longitudinal axis 144 of helicopter 102, in other embodiments vane array 110 may be asymmetric about longitudinal axis 144. For example, curved profile 134 may be skewed to either side of helicopter 102 to accommodate the difference in lateral force requirement for anti-torque and pro-torque thrusts. Length 138 of vane array 110 is shown as being less than width 140 of vane array 110. In other embodiments, however, length 138 of vane array 110 may be equal to or greater than width 140 of vane array 110. Vane plenum 136 of vane array 110 is in fluid communication with aft diffuser 114 and receives air from fan 108 via aft diffuser 114.

Each vane 132a, 132b, 132c, 132d, 132e, 132f, 132g, 132h, 132i, 132j, 132k is pivotable about a respective rotational axis 142a, 142b, 142c, 142d, 142e, 142f, 142g, 142h, 142i, 142j, 142k, which are collectively referred to as rotational axes 142. Rotational axes 142 are parallel with respect to one another and are perpendicular to longitudinal axis 144 of helicopter 102. Vanes 132 include anti-torque vanes 132a, 132b, 132c, 132d, 132e, pro-torque vanes 132g, 132h, 132i, 132j, 132k and center vane 132f at aft end 110b of vane array 110 interposed between anti-torque vanes 132a, 132b, 132c, 132d, 132e and pro-torque vanes 132g, 132h, 132i, 132j, 132k. In other embodiments, vane array 110 may include more than one center vane. Anti-torque vanes 132a, 132b, 132c, 132d, 132e and pro-torque vanes 132g, 132h, 132i, 132j, 132k are each pivotable about their respective rotational axes 142a, 142b, 142c, 142d, 142e, 142g, 142h, 142i, 142j, 142k between an open position to allow, direct or divert air out of vane plenum 136, a closed position to fully or partially block air from exiting vane plenum 136 and intermediate positions therebetween. Center vane 132f is also rotatable about its rotational axis 142f to direct air to either side of vane array 110. Center vane 132f is rotatable 180 degrees, although in other embodiments center vane 132f may have a wider or narrower angular range of motion. In the illustrated example, anti-torque vanes 132a, 132b, 132c, 132d, 132e are open, center vane 132f is open and pro-torque vanes 132g, 132h, 132i, 132j, 132k are closed to produce anti-torque thrust 146, which may be referred to as the anti-torque mode of vane array 110. Opening anti-torque vanes 132a, 132b, 132c, 132d, 132e produces anti-torque thrust 146 and opening pro-torque vanes 132g, 132h, 132i, 132j, 132k produces pro-torque thrust, which is in the opposite direction than anti-torque thrust 146. Additionally, vanes 132 may pivot about rotational axes 142 to produce thrust in any direction along a sweep angle such as sweep angle 38 illustrated in FIG. 1C.

Figure 4A:
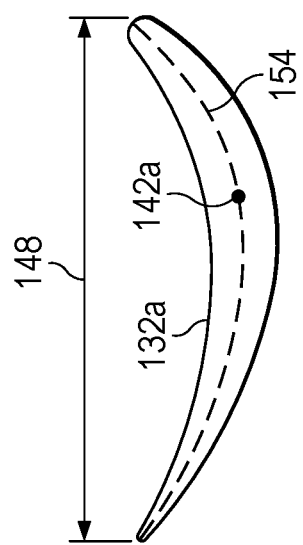
FIGS. 4A-4C are top views of selected vanes of the vane array in FIG. 3 in accordance with embodiments of the present disclosure.
Figure 4B:
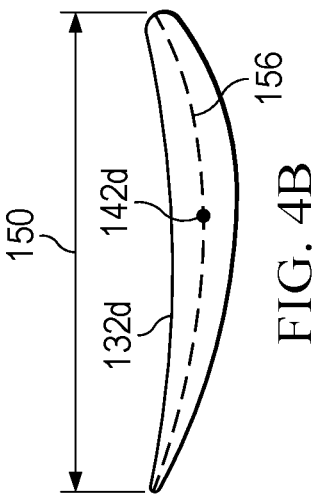
Figure 4C:
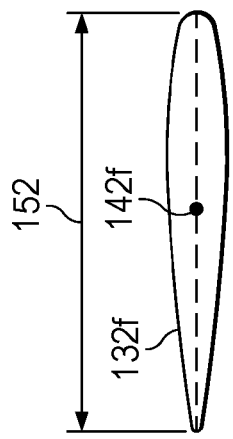

Referring additionally to FIGS. 4A-4C in the drawings, selected vanes from vane array 110 including anti-torque vane 132a, anti-torque vane 132d and center vane 132f are illustrated. Vanes 132 are fixed geometry vanes. In some embodiments, vanes 132 may have a monolithic construction. In other embodiments, vanes 132 may be segmented along the spanwise length or chordwise length of each vane. In yet other embodiments, vanes 132 may be monolithically constructed in the chordwise direction and segmented in the spanwise direction. Vanes 132 have nonuniform chordwise lengths. In the illustrated embodiment, vanes 132 vary in chordwise length from increasing to decreasing chordwise length from forward end 110a to aft end 110b of vane array 110. For example, anti-torque vane 132a has a chordwise length 148, which is greater than chordwise length 150 of anti-torque vane 132d. Chordwise length 150 of anti-torque vane 132d is greater than chordwise length 152 of center vane 132f. In other embodiments, vanes 132 may have a uniform chordwise length or may vary in chordwise length from increasing to decreasing chordwise length from aft end 110b to forward end 110a of vane array 110.

Vanes 132 also have nonuniform airfoil shapes. More particularly, anti-torque vanes 132a, 132b, 132c, 132d, 132e and pro-torque vanes 132g, 132h, 132i, 132j, 132k each have a cambered airfoil shape and center vane 132f has a symmetrical airfoil shape. Anti-torque vanes 132a, 132b, 132c, 132d, 132e and pro-torque vanes 132g, 132h, 132i, 132j, 132k have nonuniform cambers. In particular, the cambers of anti-torque vanes 132a, 132b, 132c, 132d, 132e and pro-torque vanes 132g, 132h, 132i, 132j, 132k vary from increasing to decreasing camber from forward end 110a to aft end 110b of vane array 110. For example, camber line 154 of anti-torque vane 132a has a greater curvature than camber line 156 of anti-torque vane 132d. Since center vane 132f is a symmetrical airfoil, vane 132f has no camber. In other embodiments, anti-torque vanes 132a, 132b, 132c, 132d, 132e and pro-torque vanes 132g, 132h, 132i, 132j, 132k may have uniform cambers or may vary from increasing to decreasing camber from aft end 110b to forward end 110a of vane array 110. It will be appreciated by one of ordinary skill in the art that vanes 132 may have any airfoil shape(s) including symmetrical, symmetrical biconvex, semi-symmetrical, nonsymmetrical, nonsymmetrical biconvex, flat bottom, cambered, under-cambered, reflex cambered, double cambered, supercritical or any other airfoil shapes.

Figure 5A:
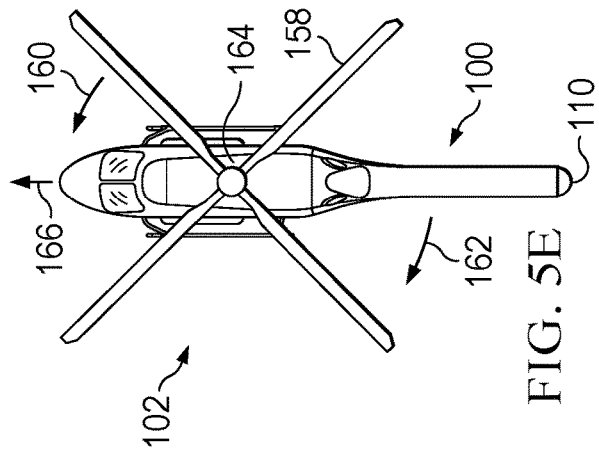
Figure 5C:
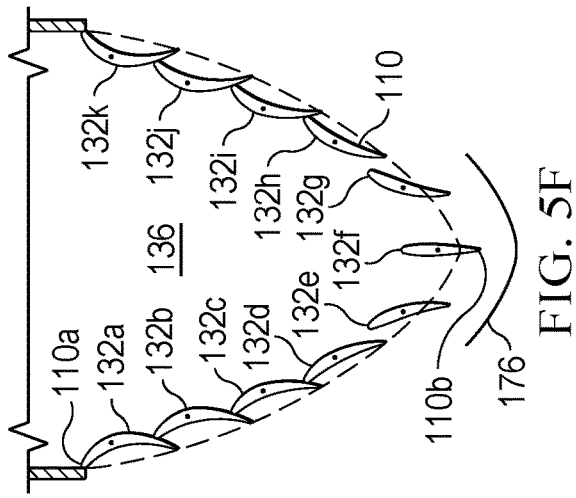
Figure 5E:
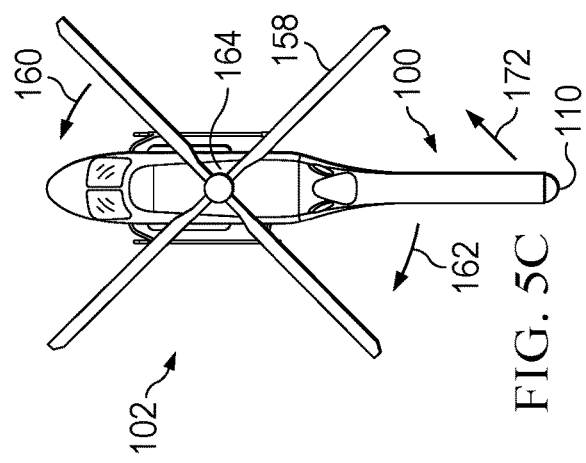
Figure 5B:
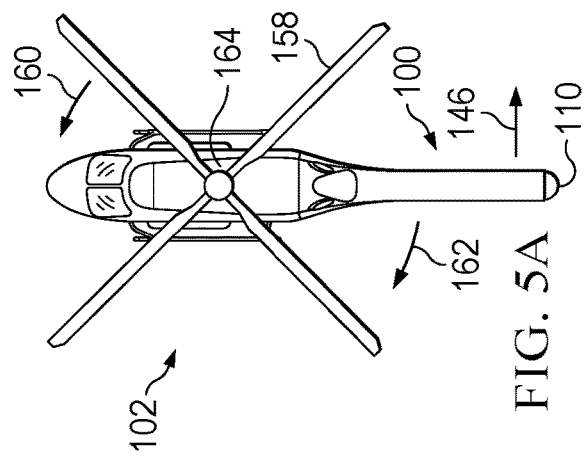
Figure 5D:
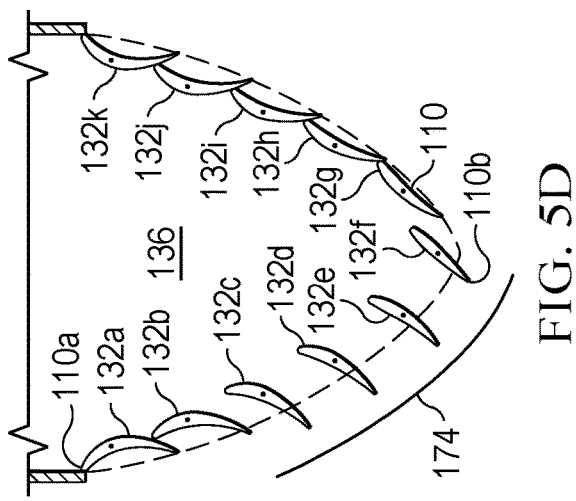
Figure 5F:
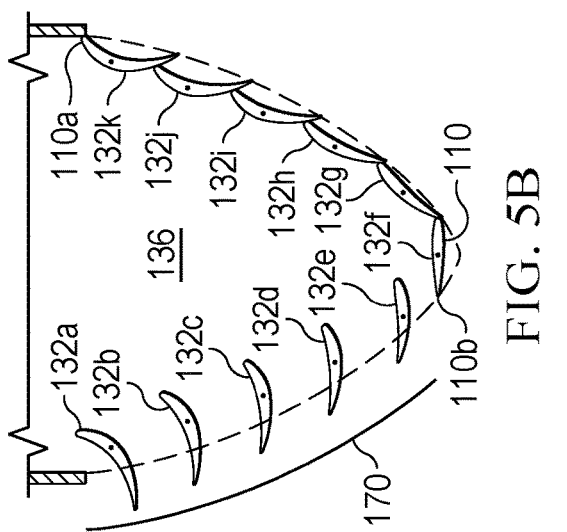

Referring additionally to FIGS. 5A-5L in the drawings, the various modes of vane array 110 in operation are schematically illustrated. Main rotor 158 of helicopter 102 rotates in a direction indicated by arrow 160, which produces torque 162 on fuselage 164. Vanes 132 pivot to switch vane array 110 between various modes including an anti-torque mode to produce anti-torque thrust 146, a forward thrust mode to produce forward thrust 166 and a pro-torque mode to produce pro-torque thrust 168. In FIGS. 5A-5B, vane array 110 is in the anti-torque mode. Anti-torque vanes 132a, 132b, 132c, 132d, 132e and center vane 132f are open and pro-torque vanes 132g, 132h, 132i, 132j, 132k are closed to produce anti-torque thrust 146 that counteracts torque 162 on fuselage 164. To produce anti-torque thrust 146, air is allowed from vane plenum 136 by vanes 132a, 132b, 132c, 132d, 132e, 132f through outlet area 170. In FIGS. 5C-5D, vane array 110 is in a mode intermediate to the anti-torque mode of FIGS. 1A-1B and the forward thrust mode of FIGS. 5E-5H. Vanes 132a, 132b, 132g, 132h, 132i, 132j, 132k are closed and vanes 132c, 132d, 132e, 132f are open to produce intermediate thrust 172, which has both anti-torque thrust and forward thrust components. To produce intermediate thrust 172, air is allowed from vane plenum 136 by vanes 132c, 132d, 132e, 132f through outlet area 174. When switching between modes, vanes 132 do not all turn at the same time because doing so would inefficiently enlarge the outlet area of vane array 110, thereby wasting the pressure, air flow and thrust of vane array 110. For example, in switching from the anti-torque mode into the intermediate mode shown in FIGS. 5C-5D, vanes 132a, 132b, 132c, 132d, 132e, 132f are rotated and vanes 132g, 132h, 132i, 132j, 132k are not rotated.

In addition, the vanes that rotate when switching between modes do so at nonuniform rotational speeds. For example, when switching out of the anti-torque mode, anti-torque vanes 132a, 132b, 132c, 132d, 132e rotate into the closed position successively from forward end 110a to aft end 110b of vane array 110 such that anti-torque vane 132a closes before anti-torque vane 132b, which closes before anti-torque vane 132c, which closes before anti-torque vane 132d, which closes before anti-torque vane 132e. FIGS. 5C-5D show vane array 110 at a moment in time as vane array 110 switches from the anti-torque mode of FIGS. 5A-5B to the forward thrust mode of FIGS. 5E-5H, at which moment in time anti-torque vanes 132a, 132b are closed and anti-torque vanes 132c, 132d have yet to be closed in succession. Conversely, when switching into the anti-torque mode, anti-torque vanes 132a, 132b, 132c, 132d, 132e rotate into the open position successively from aft end 110b to forward end 110a of vane array 110 such that anti-torque vane 132e opens before anti-torque vane 132d, which opens before anti-torque vane 132c, which opens before anti-torque vane 132b, which opens before anti-torque vane 132a. In other embodiments, the vanes that rotate when switching between modes may do so at a uniform rotational speed.

In FIGS. 5E-5H, vane array 110 is in the forward thrust mode. A forward subset of anti-torque vanes, namely anti-torque vanes 132a, 132b, 132c, 132d, is closed, an aft subset of anti-torque vanes, namely anti-torque vane 132e, is open, center vane 132f is parallel, or aligned, with longitudinal axis 144 of helicopter 102, a forward subset of pro-torque vanes, namely pro-torque vanes 132h, 132i, 132j, 132k, is closed and an aft subset of pro-torque vanes, namely pro-torque vane 132g, is open to produce forward thrust 166 to supplement the forward airspeed of helicopter 102. To produce forward thrust 166, air is allowed from vane plenum 136 by vanes 132e, 132f, 132g through outlet area 176. In other embodiments, different combinations of vanes 132 may be open and closed in the forward thrust mode. For example, vanes 132d, 132h may additionally be fully or partially opened in the forward thrust mode.

In FIGS. 5I-5J, vane array 110 is in a mode intermediate to the forward thrust mode of FIGS. 5E-5H and the pro-torque mode of FIGS. 5K-5L. Vanes 132a, 132b, 132c, 132d, 132e, 132j, 132k are closed and vanes 132f, 132g, 132h, 132i are open to produce intermediate thrust 178, which has both pro-torque thrust and forward thrust components. To produce intermediate thrust 178, air is allowed from vane plenum 136 by vanes 132f, 132g, 132h, 132i through outlet area 180. When switching into the pro-torque mode, pro-torque vanes 132g, 132h, 132i, 132j, 132k rotate into the open position successively from aft end 110b to forward end 110a of vane array 110 such that pro-torque vane 132g opens before pro-torque vane 132h, which opens before pro-torque vane 132i, which opens before pro-torque vane 132j, which opens before pro-torque vane 132k. FIGS. 5I-5J show vane array 110 at a moment in time as vane array 110 switches from the forward thrust mode of FIGS. 5E-5H to the pro-torque mode of FIGS. 5K-5L, at which moment in time pro-torque vanes 132g, 132h, 132i are open and pro-torque vanes 132j, 132k have yet to be opened in succession. In FIGS. 5K-5L, vane array 110 is in the pro-torque mode. Pro-torque vanes 132g, 132h, 132i, 132j, 132k and center vane 132f are open and anti-torque vanes 132a, 132b, 132c, 132d, 132e are closed to produce pro-torque thrust 168 that supplements torque 162 on fuselage 164. To produce pro-torque thrust 168, air is allowed from vane plenum 136 by vanes 132f, 132g, 132h, 132i, 132j, 132k through outlet area 182. When switching out of the pro-torque mode, pro-torque vanes 132g, 132h, 132i, 132j, 132k rotate into the closed position successively from forward end 110a to aft end 110b of vane array 110 such that pro-torque vane 132k closes before pro-torque vane 132j, which closes before pro-torque vane 132i, which closes before pro-torque vane 132h, which closes before pro-torque vane 132g.

Outlet area 176 for the forward thrust mode shown in FIGS. 5E-5H is smaller than outlet areas 170, 182 for the anti-torque and pro-torque modes shown in FIGS. 5A-5B and 5K-5L. A smaller outlet area 176 in the forward thrust mode produces a higher exit velocity of air for enhanced forward thrust supplementation. In other embodiments, outlet area 176 for the forward thrust mode may be equal to or greater than outlet areas 170, 182 for the anti-torque and pro-torque modes. Because vanes 132 are low-inertia and can therefore pivot quickly, directional tail thrust system 100 can change thrust direction quickly and efficiently for enhanced yaw control and maneuverability. Directional tail thrust system 100 also provides a safe and quiet alternative to traditional tail rotor systems. Unlike traditional tail rotors, directional tail thrust system 100 may also serve as an auxiliary propulsion system with the ability to provide forward thrust. Directional tail thrust system 100 may also provide increased anti-torque power as compared to traditional tail rotors.

Referring to FIGS. 6A-6C in the drawings, various directional tail thrust systems having different actuator-to-vane ratios are schematically illustrated. In FIG. 6A, directional tail thrust system 200 includes a directional tail thrust system controller 202 implemented on a flight control computer 204. Directional tail thrust system 200 also includes fan 206 and vane array 208 to vary the magnitude and direction of thrust produced by directional tail thrust system 200. Each vane 210 of vane array 208 is individually actuated with a respective actuator 212 so that directional tail thrust system 200 has a 1:1 actuator-to-vane ratio. In response to pedal or other input 214 from an operator, directional tail thrust system controller 202 sends signals to selected actuators 212 to change the mode of vane array 208 by pivoting vanes 210 as described herein. Directional tail thrust system 200 may be implemented on fly-by-wire aircraft.

In FIG. 6B, directional tail thrust system 218 includes a directional tail thrust system controller 220 implemented on flight control computer 222. Directional tail thrust system 218 also includes fan 224 and vane array 226 to vary the magnitude and direction of thrust produced by directional tail thrust system 218. Actuator 228 rotates vanes 230a, 230b, 230c, 230d via one or more physical mechanisms 232 such as a cam disk, linkages, timing belts and/or a bell crank in a 1:4 actuator-to-vane ratio. Actuator 234 rotates vanes 230e, 230f, 230g via one or more physical mechanisms 236 in a 1:3 actuator-to-vane ratio. Actuator 238 rotates vanes 230h, 230i, 230j, 230k via one or more physical mechanisms 240 in a 1:4 actuator-to-vane ratio. In response to pedal or other input 242 from an operator, directional tail thrust system controller 220 sends signals to selected actuators 228, 234, 238 to change the mode of vane array 226 by pivoting vanes 230 as described herein. Physical mechanisms 232, 236, 240 move vanes 230 at desired uniform or nonuniform rotational speeds in response to actuators 228, 234, 238, respectively. For example, physical mechanisms 232, 236, 240 may include cams with different cam profiles for each vane 230 to pivot vanes 230 at different rotational speeds in response to actuators 228, 234, 238. In other embodiments, physical mechanisms 232, 236, 240 may be moved using mechanical linkages connected to pedal input 242. Such mechanical linkages may include one or more boost actuators. In non-fly-by-wire aircraft, a stability and control augmentation system may work in parallel with the mechanical linkages of the pedals through trim actuators. Other actuator-to-vane ratios may also be implemented such as 1:2, 1:5, 1:6 or higher ratios.

In FIG. 6C, directional tail thrust system 244 includes a directional tail thrust system controller 246 implemented on flight control computer 248. Directional tail thrust system 244 also includes fan 250 and vane array 252 to vary the magnitude and direction of thrust produced by directional tail thrust system 244. A single actuator 254 rotates vanes 256 via one or more physical mechanisms 258 in a 1:11 actuator-to-vane ratio. In response to pedal or other input 260 from an operator, directional tail thrust system controller 246 sends signals to actuator 254 to change the mode of vane array 252 by pivoting vanes 256 as described herein. Physical mechanism 258 moves vanes 256 at desired uniform or nonuniform rotational speeds in response to actuator 254. In other embodiments, physical mechanism 258 may be moved using mechanical linkages connected to pedal input 260. The various actuator-to-vane ratios described in FIGS. 6A-6C may be selected for use based on a number of parameters including aircraft type, cost, weight and failure mode.

Referring to FIGS. 7A-7C in the drawings, various graphs show an example relationship between pedal or other input from an aircraft operator and the magnitude and direction of the thrust provided by the directional tail thrust system in a hover or low-speed flight envelope. Graph 300 in FIG. 7A illustrates the relationship between pedal input and the blade pitch of a fan such as fan 108 in FIGS. 2A-2B. Graph 302 in FIG. 7B illustrates the relationship between pedal input and the orientation, or pitch, of a vane array such as vane array 110 in FIGS. 2-5. Graph 304 in FIG. 7C illustrates the relationship between pedal input and the sideward force generated by the directional tail thrust system. When pedal input is at zero percent, the blade pitch of the fan is at a maximum for maximum airflow to the vane array as shown in FIG. 7A and the vane array is in the anti-torque mode as shown in FIG. 7B, generating maximum anti-torque sideward force as shown in FIG. 7C. As pedal input approaches 70 percent, the blade pitch of the fan decreases, the vane array switches into the forward thrust mode and the anti-torque sideward force generated by the directional tail thrust system decreases. At 70 percent pedal input, the blade pitch of the fan has reached a minimum, the vane array is in the forward thrust mode and no sideward force is being generated by the directional tail thrust system. In the forward thrust mode, the directional tail thrust system supplements the forward airspeed of the aircraft. As pedal input approaches 100 percent, the blade pitch of the fan increases, the vane array switches into the pro-torque mode and the pro-torque sideward force generated by the directional tail thrust system increases. Because helicopters typically rely on higher levels of anti-torque thrust for yaw orientation, the maximum anti-torque force produced by the directional tail thrust system exceeds the maximum pro-torque force, although in other embodiments or aircraft implementations maximum anti-torque force may be equal to or less than maximum pro-torque force. In addition, while the directional tail thrust system is illustrated as transitioning from anti-torque force to pro-torque force at about 70 percent pedal input, such a transition may occur at other pedal input levels depending on the embodiment.

Figure 8:
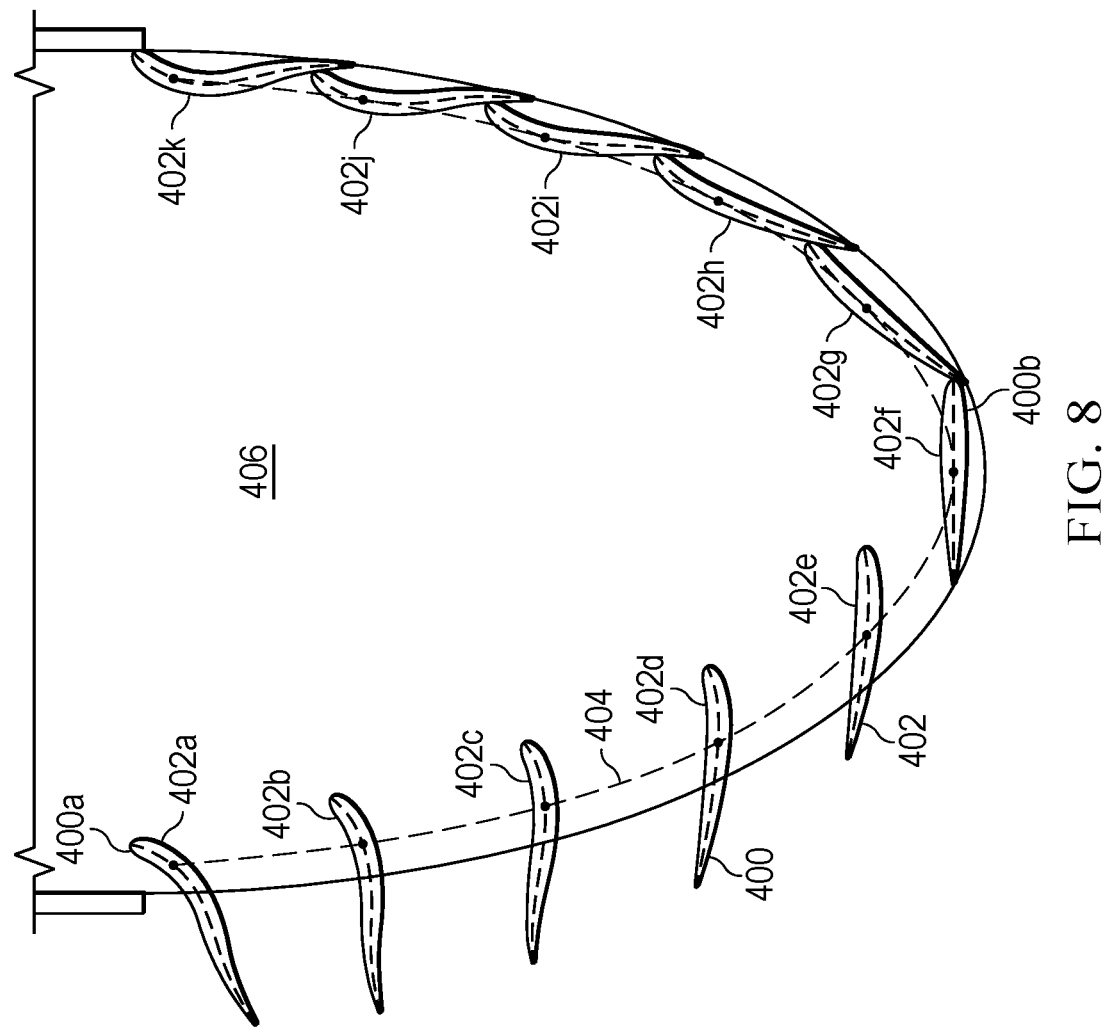
FIG. 8 is a top view of a vane array having double cambered vanes in accordance with embodiments of the present disclosure.

Referring to FIG. 8 in the drawings, a top view of a vane array is schematically illustrated and generally designated 400. Vane array 400 includes vanes 402a, 402b, 402c, 402d, 402e, 402f, 402g, 402h, 402i, 402j, 402k, collectively referred to as vanes 402. Vanes 402 are arranged along curved profile 404 to form vane plenum 406. Curved profile 404 is more elongated along the longitudinal axis than curved profile 134 in FIG. 3. Vanes 402 include anti-torque vanes 402a, 402b, 402c, 402d, 402e, pro-torque vanes 402g, 402h, 402i, 402j, 402k and center vane 402f. Vane array 400 is switchable between an anti-torque mode, forward thrust mode and pro-torque mode, with each vane 402 pivotable about its respective axis in a manner described in FIGS. 5A-5L. FIG. 8 shows vane array 400 in the anti-torque mode.

Figure 9A:
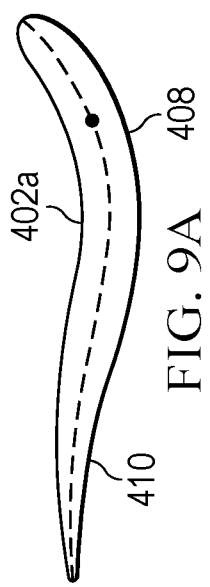
FIGS. 9A-9C are top views of selected vanes of the vane array in FIG. 8 in accordance with embodiments of the present disclosure.
Figure 9B:
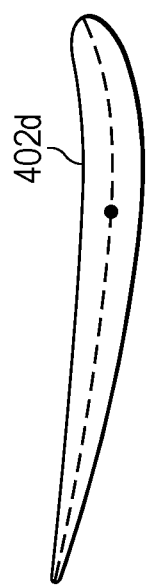
Figure 9C:
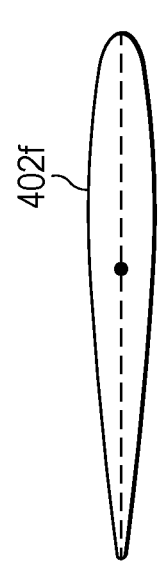

Referring additionally to FIGS. 9A-9C in the drawings, selected vanes from vane array 400 including anti-torque vane 402a, anti-torque vane 402d and center vane 402f are illustrated. Vanes 402 have nonuniform airfoil shapes. In particular, a forward subset of anti-torque vanes, namely anti-torque vanes 402a, 402b, 402c, and a forward subset of pro-torque vanes, namely pro-torque vanes 402i, 402j, 402k, have a double cambered airfoil shape. As an example, FIG. 9A shows the double cambered airfoil shape of anti-torque vane 402a having a positive cambered section 408 and a negative cambered section 410. The double cambered airfoil shape of vanes 402a, 402b, 402c, 402i, 402j, 402k allows for enhanced nesting in one another in the closed position, which reduces turbulence and drag when air flows along curved profile 404. Anti-torque vanes 402d, 402e and pro-torque vanes 402g, 402h have a cambered airfoil shape and center vane 402f has a symmetrical airfoil shape. Antitorque vanes 402a, 402b, 402c, 402d, 402e and pro-torque vanes 402g, 402h, 402i, 402j, 402k have nonuniform cambers. In particular, the positive and negative cambers of anti-torque vanes 402a, 402b, 402c and pro-torque vanes 402i, 402j, 402k vary from increasing to decreasing camber from forward end 400a to aft end 400b of vane array 400. For example, the positive and negative cambers of vane 402a have greater curvatures than the positive and negative cambers of vane 402c. In other embodiments, the positive and negative cambers of anti-torque vanes 402a, 402b, 402c and pro-torque vanes 402i, 402j, 402k may be uniform. In yet other embodiments, the positive and negative cambers of anti-torque vanes 402a, 402b, 402c and pro-torque vanes 402i, 402j, 402k may vary from decreasing to increasing camber from forward end 400a to aft end 400b of vane array 400. In addition, the cambers of anti-torque vanes 402d, 402e and pro-torque vanes 402g, 402h vary from increasing to decreasing camber from forward end 400a to aft end 400b of vane array 400. For example, the camber of anti-torque vane 402d has a greater curvature than the camber of anti-torque vane 402e. In other embodiments, anti-torque vanes 402d, 402e and pro-torque vanes 402g, 402h may have uniform cambers or may vary from decreasing to increasing camber from forward end 400a to aft end 400b of vane array 400.

Figure 10:
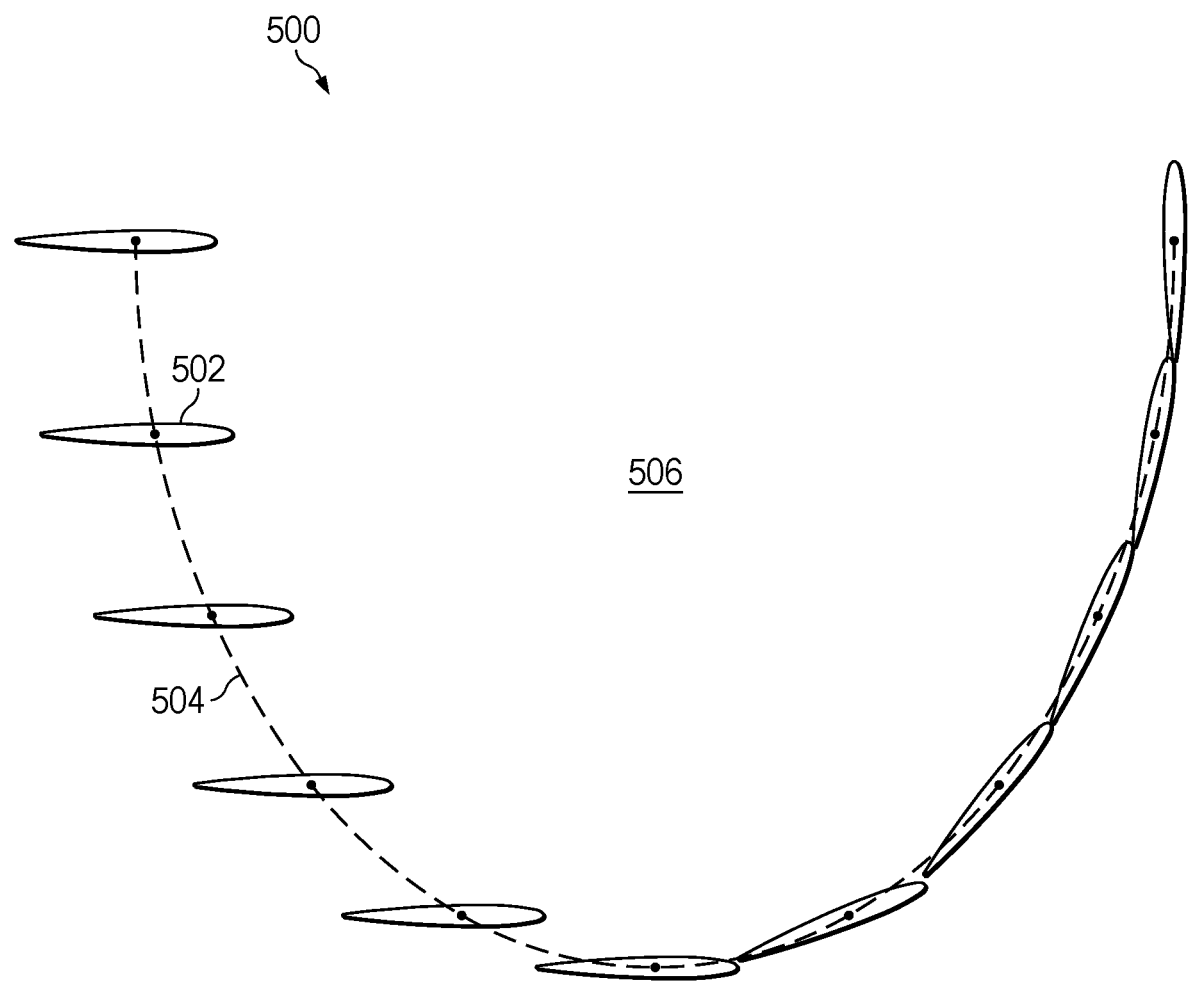
FIG. 10 is a top view of a vane array having uniform vanes with symmetrical airfoil shapes in accordance with embodiments of the present disclosure.

Referring to FIG. 10 in the drawings, a top view of a vane array is schematically illustrated and generally designated 500. Vane array 500 includes vanes 502, which are arranged along curved profile 504 to form vane plenum 506. Vane array 500 is switchable between an anti-torque mode, forward thrust mode and pro-torque mode, with each vane 502 pivotable about its respective axis in a manner described in FIGS. 5A-5L. FIG. 10 shows vane array 500 in the anti-torque mode. Vanes 502 have a uniform and symmetrical airfoil shape and a uniform chordwise length, illustrating the wide range of different configurations in which vane arrays of the illustrative embodiments may be implemented.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A directional tail thrust system for a helicopter, the directional tail thrust system comprising:
    a tailboom defining an internal air passage having a forward portion comprising a forward diffuser, an aft portion comprising an aft diffuser and a straight ducting section interposed between the forward diffuser and the aft diffuser;
    a fan in fluid communication with the aft diffuser; and
    a vane array including a plurality of fixed geometry vanes coupled to the aft diffuser and configured to receive air from the fan via the aft diffuser, the fixed geometry vanes pivotable to switch the vane array between a plurality of modes including an anti-torque mode to produce antitorque thrust, a forward thrust mode to produce forward thrust and a pro-torque mode to produce pro-torque thrust.

2. A directional tail thrust system as recited in claim 1 wherein, the helicopter has a longitudinal axis and each vane rotates about a respective rotational axis, the rotational axes of the vanes perpendicular to the longitudinal axis of the helicopter.

3. A directional tail thrust system as recited in claim 1 wherein, the vanes are arranged along a curved profile to form a vane plenum.

4. A directional tail thrust system as recited in claim 1 wherein, the fixed geometry vanes pivot at nonuniform rotational speeds when switching between the plurality of modes.

5. A directional tail thrust system as recited in claim 1 wherein, the fixed geometry vanes have nonuniform chordwise lengths.

6. A directional tail thrust system as recited in claim 1 wherein, the fixed geometry vanes have nonuniform airfoil shapes.

7. A directional tail thrust system as recited in claim 1 wherein, one or more of the fixed geometry vanes have a double cambered airfoil shape including a positive cambered section and a negative cambered section.

8. A direction tail thrust system as recited in claim 1 wherein, the internal air passage is ventless.

9. A directional tail thrust system as recited in claim 1 wherein, the fixed geometry vanes comprise a plurality of anti-torque fixed geometry vanes and a plurality of pro-torque fixed geometry vanes, the anti-torque and pro-torque fixed geometry vanes each pivotable between an open position, a closed position and intermediate positions therebetween; and
    wherein, the anti-torque fixed geometry vanes are in the open position and the pro-torque fixed geometry vanes are in the closed position in the anti-torque mode and the anti-torque fixed geometry vanes are in the closed position and the pro-torque fixed geometry vanes are in the open position in the pro-torque mode.

10. A directional tail thrust system as recited in claim 9 wherein, the vane array has a forward end and an aft end;
    wherein, the anti-torque fixed geometry vanes rotate into the closed position successively from the forward end to the aft end of the vane array when switching out of the anti-torque mode and rotate into the open position successively from the aft end to the forward end of the vane array when switching into the anti-torque mode; and
    wherein, the pro-torque fixed geometry vanes rotate into the closed position successively from the forward end to the aft end of the vane array when switching out of the pro-torque mode and rotate into the open position successively from the aft end to the forward end of the vane array when switching into the pro-torque mode.

11. A directional tail thrust system as recited in claim 9 wherein, the fixed geometry vanes further comprise one or more center fixed geometry vanes interposed between the anti-torque fixed geometry vanes and the pro-torque fixed geometry vanes; and wherein, a forward subset of the anti-torque fixed geometry vanes is in the closed position, an aft subset of the anti-torque fixed geometry vanes is in the open position, a forward subset of the pro-torque fixed geometry vanes is in the closed position, an aft subset of the pro-torque fixed geometry vanes is in the open position and the one or more center fixed geometry vanes are parallel with a longitudinal axis of the helicopter in the forward thrust mode.

12. A directional tail thrust system as recited in claim 1 wherein, two or more of the fixed geometry vanes have a fixed geometry cambered airfoil shape.

13. A directional tail thrust system as recited in claim 12 wherein, the two or more fixed geometry vanes having the fixed geometry cambered airfoil shape have nonuniform cambers.

14. A rotorcraft comprising:
a fuselage; and
a tailboom extending from the fuselage, the tailboom defining an internal air passage having a forward portion including a forward diffuser, an aft portion including an aft diffuser and a straight ducting section interposed between the forward diffuser and the aft diffuser;
a fan in fluid communication with the aft diffuser; and
a vane array including a plurality of fixed geometry vanes coupled to the aft diffuser and configured to receive air from the fan via the aft diffuser, the fixed geometry vanes pivotable to switch the vane array between a plurality of modes including an anti-torque mode to produce anti-torque thrust, a forward thrust mode to produce forward thrust and a pro-torque mode to produce pro-torque thrust.

15. The rotorcraft as recited in claim 14 wherein, the fuselage defines an air inlet forward of the fan.

16. The rotorcraft as recited in claim 14 wherein, the fixed geometry vanes partially enclose a vane plenum in fluid communication with the aft diffuser, at least a portion of the fixed geometry vanes pivotable between an open position to allow air out of the vane plenum, a closed position to at least partially block air from exiting the vane plenum and intermediate positions therebetween.

17. The rotorcraft as recited in claim 14 wherein the fixed geometry vanes have a vertical orientation.

18. The rotorcraft as recited in claim 14 wherein, the fixed geometry vanes comprise a plurality of anti-torque fixed geometry vanes, a plurality of pro-torque fixed geometry vanes and one or more center fixed geometry vanes interposed between the antitorque fixed geometry vanes and the pro-torque fixed geometry vanes; and wherein, the one or more center fixed geometry vanes have a symmetrical airfoil shape and the anti-torque fixed geometry vanes and the pro-torque fixed geometry vanes have a cambered airfoil shape.

19. The rotorcraft as recited in claim 18 wherein, the vane array has a forward end and an aft end; and wherein, the cambers of the anti-torque fixed geometry vanes and the pro-torque fixed geometry vanes vary from increasing to decreasing camber from the forward end of the vane array to the aft end of the vane array.

\* \* \* \* \*